United States Patent
Kutz et al.

(10) Patent No.: US 10,743,201 B2
(45) Date of Patent: Aug. 11, 2020

(54) SYSTEM AND METHOD FOR BLIND DETECTION OF TRANSMISSION PARAMETERS OF AN INTERFERING CELL

(71) Applicant: Ceva D.S.P. Ltd., Herzlia Pituach (IL)

(72) Inventors: Gideon Kutz, Ramat Hasharon (IL); Hagay Rozin, Raanana (IL); Zeev Kaplan, Karmiel (IL); Kfir Bezalel, Holon (IL); Jeffrey Allan (Alon) Jacob (Yaakov), Raanana (IL)

(73) Assignee: CEVA D.S.P. LTD., Herlizia Pituach (IL)

( * ) Notice: Subject to any disclaimer, the term of this patent is extended or adjusted under 35 U.S.C. 154(b) by 318 days.

(21) Appl. No.: 15/414,652

(22) Filed: Jan. 25, 2017

(65) Prior Publication Data
US 2018/0213423 A1    Jul. 26, 2018

(51) Int. Cl.
*H04W 24/10*    (2009.01)
*H04L 27/34*    (2006.01)
(Continued)

(52) U.S. Cl.
CPC ............ *H04W 24/10* (2013.01); *H04B 15/00* (2013.01); *H04J 11/005* (2013.01);
(Continued)

(58) Field of Classification Search
None
See application file for complete search history.

(56) References Cited

U.S. PATENT DOCUMENTS

| 8,867,999 B2 * | 10/2014 | Agrawal | H04W 72/082 |
| | | | 455/63.1 |
| 2007/0036250 A1 * | 2/2007 | Niedzwiecki | H04B 1/7105 |
| | | | 375/348 |

(Continued)

FOREIGN PATENT DOCUMENTS

WO    WO 2014/160984    10/2014

OTHER PUBLICATIONS

Guangxia Zhou et al. "Efficient Maximum Likelihood Detection with Imperfect Channel State Information for Interference-limited MIMO Systems" Published in SCC 2015; 10th International ITG Conference on Systems, Communications and Coding. pp. 1-6 Feb. 2-5, 2015 in Hamburg, Germany.

(Continued)

*Primary Examiner* — Gregory B Sefcheck
*Assistant Examiner* — Suk Jin Kang
(74) *Attorney, Agent, or Firm* — Pearl Cohen Zedek Latzer Baratz LLP (57) ABSTRACT

Joint demodulation of a desired transmission and an interfering transmission received from an interfering cell with an unknown combination of transmission parameters is performed. For each subcarrier, an exhaustive search for the serving cell symbols and projection for the interfering cell symbols is performed for tested hypotheses of the interfering cell, by minimizing a whitened noise parabola for each combination of searched hypothesis and hyper constellation point of the serving cell. A constellation point for the interfering cell that is closest to the minimum point of the parabola is selected, where coefficients of the parabola are calculated once for each subgroup of four modulation types of the interfering cell. A measure of likelihood for each of the tested hypotheses is calculated. A cumulative measure of likelihood for each of the tested hypotheses is calculated, (Continued)

and the most likely hypothesis is selected based on the cumulative measure of likelihood.

22 Claims, 5 Drawing Sheets

(51) Int. Cl.
  *H04B 15/00*   (2006.01)
  *H04L 5/00*   (2006.01)
  *H04L 25/03*   (2006.01)
  *H04J 11/00*   (2006.01)

(52) U.S. Cl.
  CPC ...... *H04L 5/0098* (2013.01); *H04L 25/03299* (2013.01); *H04L 25/03305* (2013.01); *H04L 27/34* (2013.01)

(56) References Cited

U.S. PATENT DOCUMENTS

| | | | | |
|---|---|---|---|---|
| 2010/0309861 A1* | 12/2010 | Gorokhov | ............ | H04B 1/7103 370/329 |
| 2011/0268019 A1* | 11/2011 | Tang | ..................... | H04L 1/0048 370/328 |
| 2012/0033683 A1* | 2/2012 | Sahlin | ................. | H04L 27/2647 370/480 |
| 2014/0140448 A1* | 5/2014 | Leach | ............... | H04L 25/03891 375/341 |
| 2014/0453510 | 6/2014 | Gomadam et al. | | |
| 2014/0301309 A1* | 10/2014 | Luo | ........................ | H04W 24/02 370/329 |
| 2015/0009964 A1* | 1/2015 | Ellenbeck | ............. | H04W 48/16 370/329 |
| 2015/0270917 A1* | 9/2015 | Roman | .................. | H04J 11/005 370/329 |
| 2015/0326290 A1* | 11/2015 | Harrison | .............. | H04B 7/0456 375/260 |
| 2015/0358089 A1* | 12/2015 | Beckman | ............... | H04B 15/00 370/329 |
| 2016/0119022 A1* | 4/2016 | Gorokhov | ............ | H04B 1/7103 455/63.1 |
| 2017/0244434 A1* | 8/2017 | Sesia | ...................... | H04J 11/005 |
| 2017/0245173 A1* | 8/2017 | Qian | ..................... | H04J 11/004 |
| 2017/0245286 A1* | 8/2017 | Rahmati | ............... | H04J 11/005 |
| 2018/0176048 A1* | 6/2018 | Qian | ..................... | H04J 11/005 |
| 2018/0176051 A1* | 6/2018 | Qian | ..................... | H04J 11/004 |

OTHER PUBLICATIONS

"The Mobile Broadband Standard" Overview of 3GPP release 12 V0.2.0 pp. 1-296; Sep. 2015.

Christian Schlegel et at: Multi user Projection Receivers, IEEE Journal on Selected Areas in Communications, IEEE Service Center, Piscataway, US, vol. 14, No. 8, Oct. 1, 1996 (Oct. 1, 1996), XP011054557, ISSN: 0733-8716.

European Search Report of Application No. EP 18 15 2849 dated Jun. 20, 2018.

* cited by examiner

SYSTEM AND METHOD FOR BLIND DETECTION OF TRANSMISSION PARAMETERS OF AN INTERFERING CELL

FIELD OF THE INVENTION

The present invention relates generally to the field of blind detection of transmission parameters of an interfering cell, for example to blind detection of transmission parameters of an interfering cell for implementing network assisted interference cancellation and subtraction (NAICS) feature of the Long-Term Evolution LTE standard release 12.

BACKGROUND

Various standards for wireless communication are known, for example, to ensure interoperability between equipment from multiple vendors. The standards typically aim to ensure that an allocated spectrum for the wireless communication system is used efficiently.

One such widely adopted standard is the 3rd Generation Partnership Project (3GPP) standard. The 3GPP standard has had many revisions, including an evolution into the Long-Term Evolution (LTE) standards. The LTE standards also continue to evolve, such that there are multiple releases, one of which is the LTE standards Release 12 (e.g., Rel-12).

NAICS (network assisted interference cancellation and subtraction) is a recently introduced feature in LTE rel. 12 (3GPP TR 36.866 V12.0.1 (2014-03) http://www.3gpp.org/dynareport/36866.htm). User equipment (UE) receivers with NAICS capabilities are required to implement advanced receiver schemes that allow substantial suppression of an interfering cell's contribution to a cellular communication signal received at the UE. This is achieved through joint demodulation of a transmission from the serving cell (which can be the desired transmission) with an interfering transmission from the interfering cell, for example, a neighboring interfering base station.

NAICS is made possible by exchange of semi-static cell configuration information between neighboring base stations and the serving base station that narrows the neighboring base station transmission modes into small sets. The sets of transmission modes may be delivered to the UE and used by the UE to simplify the joint demodulation process.

SUMMARY OF THE INVENTION

According to embodiments of the present invention, there is provided a method and system for selecting a most likely hypothesis for performing joint demodulation of a desired transmission received from a serving cell transmitting in quadrature phase-shift keying (QPSK), and an interfering transmission received from an interfering cell transmitting in an unknown combination of the following transmission parameters: modulation type, power ratio (Pa), precoding schemes and layers (PMI/RI), and transmission mode (TM). A method and system may include: for each one of a plurality of subcarriers: performing, for a plurality of tested hypotheses of the interfering cell transmission parameters, an exhaustive search over the serving cell symbols and projection for the interfering cell symbols by minimizing a whitened noise parabola for each combination of a tested hypothesis and hyper constellation point of the serving cell, and selecting a constellation point for the interfering cell that is closest (e.g., compared to other constellation points) to the minimum point of the whitened noise parabola, wherein coefficients of the whitened noise parabola are calculated once for each subgroup of four modulation types of the interfering cell, wherein a tested hypothesis comprises a single combination of the transmission parameters of the interfering cell; calculating a whitened noise metric for each combination of a tested hypothesis and hyper constellation point of the serving cell, wherein coefficients of the whitened noise metric are calculated once for each subgroup of four modulation types of the interfering cell; and calculating a measure of likelihood for each of the tested hypotheses based on the whitened noise matrices. The method may further include calculating a cumulative measure of likelihood for each of the tested hypotheses, based on the measures of likelihood of the plurality of subcarriers for the respective tested hypothesis; and selecting the most likely hypothesis based on the cumulative measure of likelihood.

Furthermore, according to embodiments of the present invention, performing the exhaustive search may include: estimating an equivalent channel matrix to generate a signal model for each of the tested hypotheses; and calculating a whitening filter for each of the tested hypotheses, based on a noise correlation matrix and on a channel estimation for the interfering cell from the equivalent channel matrix, wherein the whitened noise parabola is based on a respective whitened channel estimation matrix.

Furthermore, according to embodiments of the present invention, coefficients of the whitened noise parabola may depend on the transmission parameters of the interfering cell, as well as on the hyper constellation point of the serving cell.

Furthermore, according to embodiments of the present invention, coefficients of the whitened noise parabola may be:

$$A=\|\tilde{y}\|^2;\ B^*=(\tilde{y}^H\tilde{h});\ B=(\tilde{h}^H\tilde{y});\ \text{and}\ C=(\tilde{h}^H\tilde{h}),$$

Where y is a whitened received sample after whitening, $\tilde{y}$ is a part of a received sample that is attributed to the interfering cell after whitening, $B^*$ is a complex conjugated value of B, and $\tilde{h}^H$ is a conjugate transpose of h is one column of the interfering cell in the signal model.

Furthermore, according to embodiments of the present invention, the minimum point of the whitened noise parabola may be at $x_{min}=-B/C$.

Furthermore, according to embodiments of the present invention, C may be calculated jointly for all 16 hyper constellation points of the serving cell.

Furthermore, according to embodiments of the present invention, A and B may be calculated as a linear combination of terms that are calculated jointly for each hyper constellation point of the serving cell.

Furthermore, according to embodiments of the present invention, calculating a measure of likelihood for a subcarrier and hypothesis may include selecting a maximum value of a term that is a combination of the whitened noise metric of each constellation point of the serving cell and each hypothesis, and hypothesis dependent parameters.

Furthermore, according to embodiments of the present invention, the method may include embedding the power factor in the constellation point for a subgroup of hypotheses in which transmission mode of the serving cell is TM4 and transmission mode of the interfering cell is TM4.

Furthermore, according to embodiments of the present invention, the method may include performing the joint demodulation based on the most likely hypothesis.

Furthermore, according to embodiments of the present invention, the method may include: calculating a confidence value for the most likely hypothesis based the cumulative measures of likelihood; comparing the confidence value to a predetermined threshold; and determining whether to perform demodulation or joint demodulation based on the comparison.

According to embodiments of the present invention, there is provided a device for selecting a most likely hypothesis performing joint demodulation of a desired transmission received from a serving cell transmitting in quadrature phase-shift keying (QPSK), and an interfering transmission received from an interfering cell transmitting in an unknown combination of the following transmission parameters: modulation type, Pa, PMI/RI, and TM. The device may include: a processor configured to: for each one of a plurality of subcarriers: perform, for a plurality of tested hypotheses of the interfering cell transmission parameters, an exhaustive search over the serving cell symbols and projection for the interfering cell symbols by minimizing a whitened noise parabola for each combination of a tested hypothesis and hyper constellation point of the serving cell, and selecting a constellation point for the interfering cell that is closest to the minimum point of the whitened noise parabola, wherein coefficients of the whitened noise parabola are calculated once for each subgroup of four modulation types of the interfering cell, wherein a tested hypothesis comprises a single combination of the transmission parameters of the interfering cell; calculate a whitened noise metric for each combination of a tested hypothesis and hyper constellation point of the serving cell, wherein coefficients of the whitened noise metric are calculated once for each subgroup of four modulation types of the interfering cell; and calculate a measure of likelihood for each of the tested hypotheses based on the whitened noise matrices. The processor may be further configured to calculate a cumulative measure of likelihood for each of the tested hypotheses, based on the measures of likelihood of the plurality of subcarriers for the respective tested hypothesis; and select the most likely hypothesis based on the cumulative measure of likelihood.

Furthermore, according to embodiments of the present invention, the processor may be further configured to perform the exhaustive search by: estimating an equivalent channel matrix to generate a signal model for each of the tested hypotheses; and calculating a whitening filter for each of the tested hypotheses, based on a noise correlation matrix and on a channel estimation for the interfering cell from the equivalent channel matrix, wherein the whitened noise parabola is based on a respective whitened channel estimation matrix.

Furthermore, according to embodiments of the present invention, the processor may be further configured to calculate C jointly for all 16 hyper constellation points of the serving cell and wherein the processor is configured to calculate A and B as a linear combination of terms that are calculated jointly for each hyper constellation point of the serving cell.

Furthermore, according to embodiments of the present invention, the processor may be further configured to calculate a measure of likelihood for a subcarrier and hypothesis by selecting a maximum value of a term that is a combination of the whitened noise metric of each constellation point of the serving cell and each hypothesis, and hypothesis dependent parameters.

Furthermore, according to embodiments of the present invention, the processor may be further configured to embed the power factor in the constellation point, for a subgroup of hypotheses in which transmission mode of the serving cell is TM4 and transmission mode of the interfering cell is TM4.

Furthermore, according to embodiments of the present invention, the processor may be further configured to perform the joint demodulation based on the most likely hypothesis.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Generally, a UE receives or listens to cellular communications signals from a serving cell (e.g., first base station or "eNB") of a cellular communications Long Term Evolution (LTE) network. Other cells or eNBs of the network may be sending cellular communication signals to other UEs. Interfering cells, for example, eNBs other than the serving cell, that are located close enough to the UE so that cellular communication signals sent from these eNBs may be sensed by the UE, generate interference at the signal received by the UE.

Embodiments of the present invention will now be demonstrated in detail, and specific example will be given with reference to LTE rel. 12. However, it will be apparent to these skilled in the art that embodiments of the present invention are not limited in this regard. Embodiments of the present invention may apply to other standards, or other releases of the LTE standards. Similarly, embodiments of the present invention may apply to other unknown transmission parameters, or possible parameter values or other combinations of unknown transmission parameters.

Figure 1A:
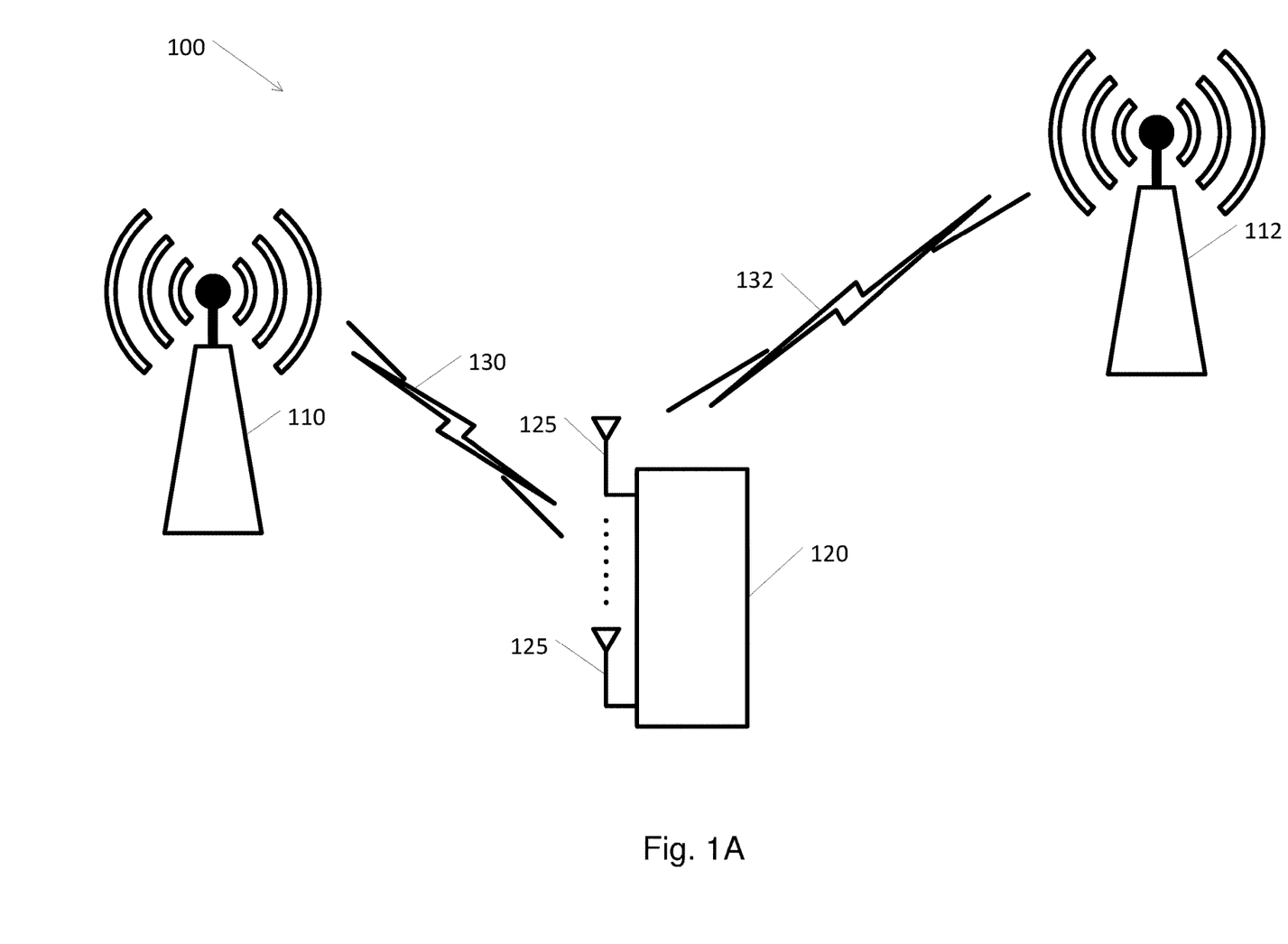
FIG. 1A is a schematic illustration of an exemplary system for blind detection of transmission parameters of an interfering cell according to embodiments of the invention.

Reference is now made to FIG. 1 which is a diagram of an exemplary cellular communications system 100, according to embodiments of the invention. Cellular communications system 100 includes a base station e.g., an evolved NodeB (eNB) or another device, of a serving cell 110, a base station, e.g., an eNB, of an interfering cell 112, and UE 120. UE 120 may refer to any device used to communicate over a wireless communication network configured to perform joint demodulation as disclosed herein. For example UE 120 may support the LTE standard, and specifically, the NAICS feature introduced in rel. 12 of the LTE standard, or an equivalent standard. UE 120 may be or may include, for example, computing devices having mobile broadband communication capabilities, e.g., a hand-held telephone or smartphone, a laptop computer equipped with a mobile broadband adapter, etc. UE 120 may include a plurality of antennae 125. Serving cell 110 and interfering cell 112 may each include a plurality of antennae (not shown). In the context of the present application, which relates to joint demodulation at the UE 120, antennae 125 of UE 120 may be referred to as receive (Rx) antennae, and the antennae of serving cell 110 and interfering cell 112 may be referred to as transmit (Tx) antennae.

Serving cell 110 may transmit cellular communications signals, e.g., desired transmission 130, to UE 120, and UE 120 may transmit cellular communication signals to serving cell 110. However, UE 120 may receive cellular communication signals, e.g., interfering transmission 132, transmitted by interfering cell 112 as well. UE 120 may be configured according to LTE standards, and specifically, supporting the NAICS feature introduced in rel. 12 of the LTE standard, or an equivalent standard. As is apparent to one of ordinary skill in the art, serving cell 110, interfering cell 112 and UE 120 are not drawn to scale and are illustrative only.

According to embodiments of the present invention, UE 120 may suppress interfering transmission 132 from interfering cell 112 by performing joint demodulation of a desired transmission 130 from serving cell 110 with the interfering transmission 132 from interfering cell 112. For example, UE 120 may include NAICS capabilities that may enable suppression of interfering transmission 132 by performing joint demodulation.

Figure 1B:
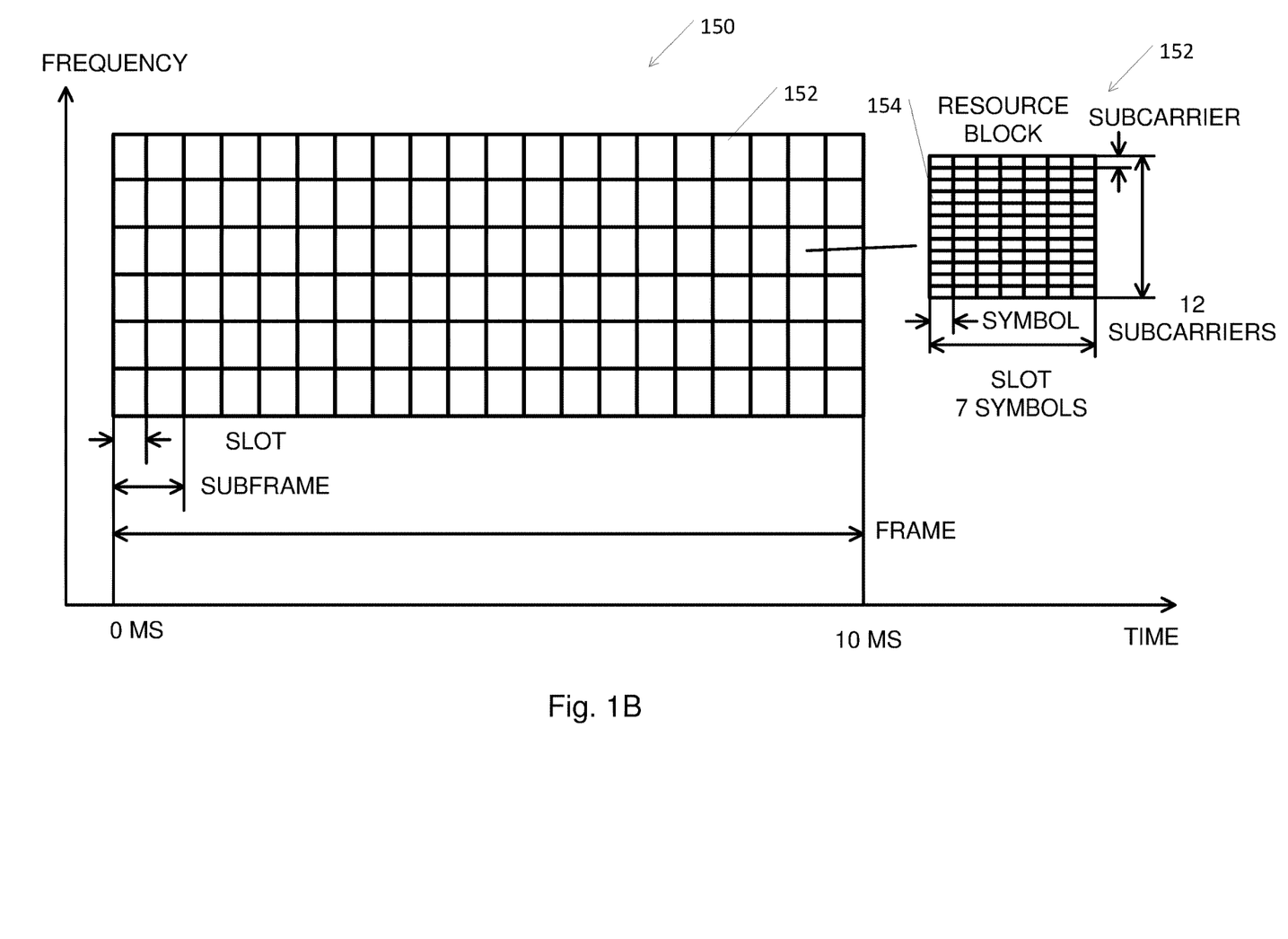
FIG. 1B which depicts an LTE frame, helpful in demonstrating embodiments of the present invention.

The LTE standard defines two types of frame structures. Type 1 uses frequency division duplexing (FDD) in which uplink and downlink transmission is separated by frequency, and type 2 uses time division duplexing (TDD), in which uplink and downlink transmission is separated in time. Reference is now made to FIG. 1B depicting an LTE frame 150, helpful in demonstrating embodiments of the present invention. Frame 150 may be divided along the time axis into for example ten subframes, or twenty slots. For example, if a frame is transmitted over 10 milliseconds (ms) as in the present example, a subframe is transmitted over 1 ms and a slot over 0.5 ms. The frame may be further divided along the frequency axis into frequency bands, for example to 180 kHz bands. The smallest resource unit that may be allocated to a user may be referred to as a resource block (RB) 152. A resource block 152 may be 1 slot long in time and 180 kHz wide in frequency. A RB may be further divided in frequency, to for example 12 subcarriers (for example, 15 kHz each) or to 24 subcarriers (for example, 7.5 kHz each), and in time to for example six or seven symbols time. A unit of 1 subcarrier×1 symbol time, which may be referred to as a resource element or a symbol, may contain a single complex value representing transmitted data. In TDD mode, the uplink and downlink subframes are multiplexed in the time domain and are transmitted on the same frequency. Thus, frame structure may be different. Embodiments of the present invention apply to both FDD and TDD.

In order to achieve joint demodulation, both the transmission parameters of serving cell 110 as well as the transmission parameters of interfering cell 112 should be known at UE 120. The transmission parameters may include, for example, modulation type, e.g., quadrature phase-shift keying (QPSK), 16 Quadrature amplitude modulation (QAM), 64 QAM, 256 QAM, power ratio (Pa), combinations of precoding schemes (PMI) and layers (RI), referred to herein as PMI/RI, and TM, and many other parameters. TM modes used herein, e.g., TM2, TM3, TM4, as well as other definitions of parameters, including levels of Pa, refer to the definitions in LTE rel. 12. As used herein, a hypothesis may refer to a speculation on the actual combination of transmission parameters including, for example, modulation type, Pa, PMI/RI and TM. While the transmission parameters of serving cell 110 are made available to UE 120 by transmitting them as part of the control channels information, not all of the interferer parameters are transmitted to UE 120. For example, the following parameters of interfering cell 112 may be transmitted to UE 120 (other or different parameters may be sent): Cell identity number (Cell ID), Cell-specific reference signals antenna port (CRS AP), Multicast-broadcast single-frequency network (MB-SFN) configuration, Demodulation Reference Signal (DMRS) or CRS based TM. Thus, there is a need to blindly (e.g., without certain information) derive at or estimate some of the transmission parameters of interfering cell 112, based on the received transmission. The blind estimation of unknown transmission parameters of interfering cell 112 is one of the main difficulties in NAICS and a major source for increased complexity. According to some embodiments there may be up to 108 hypotheses of unknown transmission parameters combinations (with other embodiments and standards different number of parameters may be used). For example, the following combinations of unknown transmission parameters may be used by interfering cell 112:

If serving cell 110 uses TM4 or TM9, 108 hypotheses for interfering cell 112 may be supported (as with other equations in the present application, other or different equations may be used):

$$108 \text{ hypotheses} = 3(Pa) * (7(PMI/RI)_{(TM4/TM9)} + 1(TM2) + 1(TM3)) * 4(\text{modulation type}) \quad \text{(Equation 1)}$$

Where:
  3(Pa) represents three possible levels of Pa,
  4(modulation type) represents four modulation types,
  $7(PMI/RI)_{(M4/M9)}$ represents seven options of PMI/RI of interfering cell 112 when transmitting in TM4 or TM9,
  1(TM2) represents one option of interfering cell transmitting in TM2, and
  1(TM3) represents one option of interfering cell 112 transmitting in TM3.

Thus, each of the three possible levels of Pa may be combined with four modulation types, and with seven options for interfering cell 112 transmitting in TM4 or TM9, one option of interfering cell 112 transmitting in TM2, and one option of interfering cell 112 transmitting in TM3. Another option is the possibility of no interfering cell, referred to as no physical downlink shared channel (PDSCH). In this case no joint demodulation is required.

If serving cell 110 uses TM2, 36 hypotheses for interfering cell 112 may be supported:

36 hypotheses=3(Pa)*(1(TM2)+1(TM3)+1(TM4/ TM9))*4(modulation type)     (Equation 2)

Where:
1(TM4/TM9) one option of interfering cell transmitting in TM4 or TM9,

Thus, each of the three possible levels of Pa, may be combined with four modulation types, and with one option for interfering cell 112 transmitting in TM4 or TM9, one option of interfering cell 112 transmitting in TM2, and one option of interfering cell 112 transmitting in TM3. Again there is an option of no interfering cell.

According to embodiments of the present invention, transmission modes of serving cell 110 and interfering cell 112 may include the example combinations as defined in table 1.

TABLE 1

Transmission modes of serving cell 110 and interfering cell 112.

| Label | Transmission mode of the serving cell | Transmission mode of the interfering cell | Rank (RI) of the interfering cell |
|---|---|---|---|
| TM2/TM2 | TM2 | TM2 | |
| TM2/TM4 (RI = 2) | TM2 | TM9 or TM4 | 2 |
| TM2/TM4 (RI = 1) | TM2 | TM9 or TM4 | 1 |
| TM4/TM2 | TM9 or TM4 | TM2 | |
| TM4/TM4 (RI = 2) | TM9 or TM4 | TM9 or TM4 | 2 |
| TM4/TM4 (RI = 1) | TM9 or TM4 | TM9 or TM4 | 1 |
| TM2/TM3 | TM2 | TM3 | |
| TM4/TM3 | TM9 or TM4 | TM3 | |

Selecting the best hypothesis may include performing joint demodulation of each subcarrier for each hypothesis, using the transmission parameters of the specific hypothesis, and calculating a measure of likelihood that the hypothesis is correct for each subcarrier of each hypothesis. Then, the measure of likelihood may be combined over subcarriers, e.g., accumulated or averaged, and the most probable hypothesis, e.g., the hypothesis having the largest cumulative or combined measure of likelihood, may be selected. Since there may be 108 (or in other embodiments other numbers) hypotheses, theoretically the joint demodulation and the calculation of measure of likelihood may have to be repeated 108 times. Therefore, joint demodulation may increase the demodulation complexity by a factor of up to 108 compared to demodulation when the channel parameters are known, for the same number of subcarriers. There is a need, therefore, to find an algorithm that may perform the joint demodulation more efficiently, for example, by calculating at least some of the parameters, coefficients or equations once for a plurality of hypotheses to reduce the complexity.

Embodiments of the present invention provide methods for joint demodulation which is suited for blind detection of transmission parameters of an interfering cell. Embodiments of the invention may include efficient maximum likelihood (ML) detection per hypothesis by combination of an exhaustive search for the serving cell symbols and projection for the interfering cell symbols. Embodiments of the invention may further include incorporation of hypothesis evaluation into the exhaustive search process, thus allowing reusing a portion of the calculations for evaluating different hypotheses. As used herein, exhaustive search may refer to finding transmitted values by scanning through all possible combinations of values of the serving cell symbols, and projection may refer to a method of finding transmitted values of one layer after hypothesizing on the transmitted value at all other layers. The ML detection algorithm is a known method for detecting the transmitted MIMO signal. The straight forward implementation of ML detection algorithm may include calculating an ML metric, e.g., a measure of likelihood, for each possible transmitted value and selecting the transmitted value having the best metric, for example by using equation 22 when searching over the serving cell symbols, x0 & x1 only. Another option for detecting the transmitted MIMO signal would be using tree search. The tree search is often more efficient (e.g., uses fewer calculations) than exhaustive search. When NAICS is in use the serving cell is transmitting QPSK only. Thus, for each layer there are four possible transmitted values and a total of 16 options for the combination of the two layers. Thus, for QPSK the complexity of detecting the transmitted MIMO signal using exhaustive search is not larger than a tree search, especially since a tree search requires some pre calculations. However, embodiments of the invention are not limited in this regard, and any method, including exhaustive search and tree-search may be used for detecting the transmitted MIMO signal in combination with embodiments of the present invention.

According to some embodiments of the invention, at least all four modulation types of interfering cell 112, e.g., QPSK, 16 QAM, 64 QAM, 256 QAM, may be at least partially evaluated in parallel, leading to reduction to nearly 25% of the original complexity. Some minimal processing may still be needed per hypothesis. In some scenarios, the three levels of Pa of the data may also be incorporated into the search leading to reduction to nearly 1/12 (12=3 power values*4 modulations options) of the original complexity. According to some embodiments of the invention, the same calculations may be used for the blind estimation phase as well as for the demodulation phase. This is important in case of hardware implementations as the NAICS demodulation is composed of a first stage of interferer parameters detection, performed by searching the 108 hypotheses, and demodulation phase, in which the hypothesis with the best ML from the first stage is used to estimate the serving cell transmitted data. According to embodiments of the present invention, both stages may be performed with the same hardware, e.g., by reusing the same calculations or by using the same hardware at different time intervals. Thus, embodiments of the present invention may reduce the complexity of the calculations, freeing processor time, and may efficiently use hardware resources.

According to embodiments of the present invention, joint demodulation may be performed in cases of poor signal quality. According to the LTE standard NAICS may be used only when the modulation type of the serving cell is QPSK. Thus, joint demodulation is in one embodiment performed only when the modulation type at the serving cell is QPSK.

Next, a signal model for interfering cell 112 and serving cell 110 is presented. A generic signal model may be based on the equation:

$$y = Hx + n \quad \text{(Equation 3)}$$

Where:
- y is a vector of received samples.
- H is a channel estimation matrix, also referred to as the channel equivalent matrix.
- x is a vector of the transmitted symbols, both from interfering cell 112 and serving cell 110.

The channel estimation matrix, H, is a concatenation of serving cell 110 and interfering cell 112 such that:

$$H = [H_S \; H_I] \quad \text{(Equation 4)}$$

Where $H_S$ is the channel estimation matrix representing serving cell 110 contribution to the signal and $H_I$ is the channel estimation matrix representing the contribution of interference cell 112. It will be useful for the algorithm description to introduce a notation for the column of the matrix H, that is $H=[h_0 \ldots h_{N-1}]$ where $h_q$ is the q-th column of matrix H. As with all equations shown herein, other equations may be used.

The exact content of y, H and x depends on the transmission mode of serving cell 110 and the hypothesis on the interference cell transmission mode. Each of the 108 hypotheses may have a channel estimation matrix. However, the form of the channel estimation matrix may be common to hypotheses, as detailed next. For example, channel estimation matrices of TM2/TM2 may all have the same form as Equation 5 presented below, however, the values of $h_{s,i,j}$ and $h_{I,i,j}$ may be different for different Pa levels. The signal model may be given for a pair of subcarriers, numbered 0 and 1.

It is noted that TM2 uses pairing as part of a transmit diversity scheme, also referred to as space frequency block coding (SFBC). The transmit diversity uses two subcarriers for transmitting two symbols. For example, the transmitter may send the value of S0 over antenna 0 (port0) at subcarrier A, the value of −S1* over antenna 1 (port1) at subcarrier A, the value of S1 over antenna 0 at subcarrier B and the value of S0* over antenna 1 at subcarrier B. The receiver may use this diversity to better decode the values S0 and S1. Equation 5 takes this diversity into account and outputs the values of S0 and S1 instantly. Equation 5 may consider the use of SFBC (TM2) both at the serving cell and at the interfering cell.

Furthermore, the following notations are used:
- $y_{i,l}$—a received sample for l-th subcarrier and i-th receive antenna.
- $h_{s,i,j}$—channel estimation for serving cell 110, for j-th Tx antenna (for TM2) or j-th layer (for TM4 or TM9) and i-th receive antenna.
- $h_{I,i,j}$—channel estimation for interfering cell 112, for j-th Tx antenna (for TM2) or j-th layer (for TM4 or TM9) and i-th receive antenna.
- $x_{s,m}$—transmitted symbol from serving cell 110, for the m-th symbol (two symbols for SFBC).
- $x_{I,m}$—transmitted symbol from interfering cell 112, for the m-th symbol (two symbols for SFBC).
- n—vector of noise samples.

Using the above notations, the signal model may be given the following form, depending on the combination of transmission modes (an asterisk sign '*' represents a complex conjugated value).

TM2/TM2

$$\begin{bmatrix} y_{0,0} \\ y_{0,1}^* \\ y_{1,0} \\ y_{1,1}^* \end{bmatrix} = \begin{bmatrix} h_{s,0,0} & -h_{s,0,1} & h_{I,0,0} & -h_{I,0,1} \\ h_{s,0,1}^* & h_{s,0,0}^* & h_{I,0,1}^* & h_{I,0,0}^* \\ h_{s,1,0} & -h_{s,1,1} & h_{I,1,0} & -h_{I,1,1} \\ h_{s,1,1}^* & h_{s,1,0}^* & h_{I,1,1}^* & h_{I,1,0}^* \end{bmatrix} \begin{bmatrix} x_{s,0} \\ x_{s,1}^* \\ x_{I,0} \\ x_{I,1}^* \end{bmatrix} + n \quad \text{(Equation 5)}$$

TM2/TM4 (RI=1):

$$\begin{bmatrix} y_{0,0} \\ y_{0,1}^* \\ y_{1,0} \\ y_{1,1}^* \end{bmatrix} = \begin{bmatrix} h_{s,0,0} & -h_{s,0,1} & h_{I,0,0} & 0 \\ h_{s,0,1}^* & h_{s,0,0}^* & 0 & h_{I,0,0}^* \\ h_{s,1,0} & -h_{s,1,1} & h_{I,1,0} & 0 \\ h_{s,1,1}^* & h_{s,1,0}^* & 0 & h_{I,1,0}^* \end{bmatrix} \begin{bmatrix} x_{s,0} \\ x_{s,1}^* \\ x_{I,0} \\ x_{I,1}^* \end{bmatrix} + n \quad \text{(Equation 6)}$$

TM2/TM4 (RI=2) and TM2/TM3:

$$\begin{bmatrix} y_{0,0} \\ y_{0,1}^* \\ y_{1,0} \\ y_{1,1}^* \end{bmatrix} = \begin{bmatrix} h_{s,0,0} & -h_{s,0,1} & h_{I,0,0} & 0 & h_{I,01,} & 0 \\ h_{s,0,1}^* & h_{s,0,0}^* & 0 & h_{I,0,0}^* & 0 & h_{I,0,1}^* \\ h_{s,1,0} & -h_{s,1,1} & h_{I,1,0} & 0 & h_{I,1,1} & 0 \\ h_{s,1,1}^* & h_{s,1,0}^* & 0 & h_{I,1,0}^* & 0 & h_{I,1,1}^* \end{bmatrix} \begin{bmatrix} x_{s,0} \\ x_{s,1}^* \\ x_{I,0} \\ x_{I,2}^* \\ x_{I,1} \\ x_{I,3}^* \end{bmatrix} + n \quad \text{(Equation 7)}$$

TM4/TM2:

$$\begin{bmatrix} y_{0,0} \\ y_{0,1}^* \\ y_{1,0} \\ y_{1,1}^* \end{bmatrix} = \begin{bmatrix} h_{s,0,0} & 0 & h_{I,0,0} & -h_{I,0,1} \\ 0 & h_{s,0,0}^* & h_{I,0,1}^* & h_{I,0,0}^* \\ h_{s,1,0} & 0 & h_{I,1,0} & -h_{I,1,1} \\ 0 & h_{s,1,0}^* & h_{I,1,1}^* & h_{I,1,0}^* \end{bmatrix} \begin{bmatrix} x_{s,0} \\ x_{s,1*} \\ x_{I,0} \\ x_{I,1*} \end{bmatrix} + n \quad \text{(Equation 8)}$$

TM4/TM4 (RI=1):

$$\begin{bmatrix} y_{0,0} \\ y_{0,1}^* \\ y_{1,0} \\ y_{1,1}^* \end{bmatrix} = \begin{bmatrix} h_{s,0,0} & 0 & h_{I,0,0} & 0 \\ 0 & h_{s,0,0}^* & 0 & h_{I,0,0}^* \\ h_{s,1,0} & 0 & h_{I,1,0} & 0 \\ 0 & h_{s,1,0}^* & 0 & h_{I,1,0}^* \end{bmatrix} \begin{bmatrix} x_{s,0} \\ x_{s,1}^* \\ x_{I,0} \\ x_{I,1}^* \end{bmatrix} + n \quad \text{(Equation 9)}$$

The matrix of TM4/TM4 (RI=1) may be divided into two distinct subcarriers leading to:

$$\begin{bmatrix} y_{0,0} \\ y_{1,0} \end{bmatrix} = \begin{bmatrix} h_{s,0,0} & h_{I,0,0} \\ h_{s,1,0} & h_{I,1,0} \end{bmatrix} \begin{bmatrix} x_{s,0} \\ x_{I,0} \end{bmatrix} + n \quad \text{(Equation 10)}$$

$$\begin{bmatrix} y_{0,1} \\ y_{1,1} \end{bmatrix} = \begin{bmatrix} h_{s,0,0} & h_{I,0,0} \\ h_{s,1,0} & h_{I,1,0} \end{bmatrix} \begin{bmatrix} x_{s,1} \\ x_{I,1} \end{bmatrix} + n$$

TM4/TM4 (RI=2), and TM4/TM3:

$$\begin{bmatrix} y_{0,0} \\ y_{0,1}^* \\ y_{1,0} \\ y_{1,1}^* \end{bmatrix} = \quad \text{(Equation 11)}$$

$$\begin{bmatrix} h_{s,0,0} & 0 & h_{I,0,0} & 0 & h_{I,0,1} & 0 \\ 0 & h_{s,0,0}^* & 0 & h_{I,0,0}^* & 0 & h_{I,0,1}^* \\ h_{s,1,0} & 0 & h_{I,1,0} & 0 & h_{I,1,1} & 0 \\ 0 & h_{s,1,0}^* & 0 & h_{I,1,0}^* & 0 & h_{I,1,1}^* \end{bmatrix} \begin{bmatrix} x_{s,0} \\ x_{s,1}^* \\ x_{I,0} \\ x_{I,2}^* \\ x_{I,1} \\ x_{I,3}^* \end{bmatrix} + n$$

The matrix of TM4/TM4 (RI=2) may be divided into two distinct subcarriers leading to:

$$\begin{bmatrix} y_{0,0} \\ y_{1,0} \end{bmatrix} = \begin{bmatrix} h_{s,0,0} & h_{I,0,0} & h_{I,0,1} \\ h_{s,1,0} & h_{I,1,0} & h_{I,1,1} \end{bmatrix} \begin{bmatrix} x_{s,0} \\ x_{I,0} \\ x_{I,1} \end{bmatrix} + n \quad \text{(Equation 12)}$$

$$\begin{bmatrix} y_{0,1} \\ y_{1,1} \end{bmatrix} = \begin{bmatrix} h_{s,0,0} & h_{I,0,0} & h_{I,0,1} \\ h_{s,1,0} & h_{I,1,0} & h_{I,1,1} \end{bmatrix} \begin{bmatrix} x_{s,1} \\ x_{I,2} \\ x_{I,3} \end{bmatrix} + n$$

These matrixes may result with one QPSK layer of the serving cell and two layers with up to QAM256 of the interfering cell. Embodiments of the present invention may perform whitening on one of the interfering cell layers to obtain or calculate a matrix that is similar to the matrix of TM4/TM4 (RI=1), Equation 9.

Figure 2:
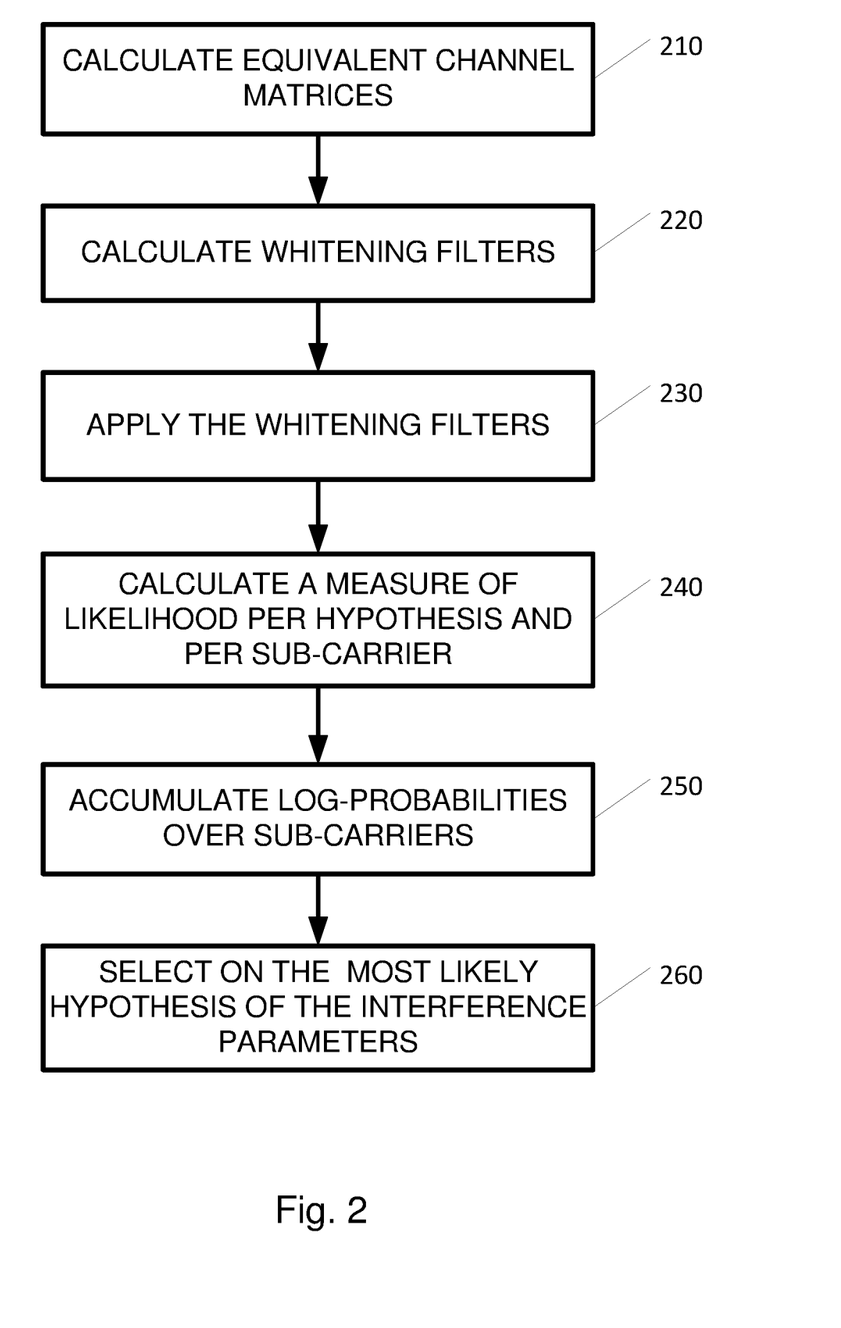
FIG. 2 is a flowchart diagram illustrating a method for blind detection of transmission parameters of an interfering cell according to embodiments of the present invention.

Reference is now made to FIG. 2, which is a flowchart diagram illustrating a method for blind detection of transmission parameters of an interfering cell and joint demodulation, according to embodiments of the present invention. According to some embodiments, a method for blind detection of transmission parameters of an interfering cell, e.g., interfering cell 112, and joint demodulation may be performed by any suitable processor, for example, processor 410 depicted in FIG. 4. According to some embodiments, a method for blind detection of transmission parameters of an interfering cell and joint demodulation, may be performed by UE, for example, UE 120. In some embodiments a method for blind detection of transmission parameters of an interfering cell and joint demodulation may be performed by a processor (e.g., processor 410) and initiated by a set of commands or instructions.

In operation 210 equivalent channel matrices may be calculated or estimated, using any applicable method, as known in the art.

In operation 220 a plurality of whitening filters may be calculated. As used herein, a whitening filter may refer to for example a filter that when applied to the signal model, e.g., the signal model of equation 3, transforms all other channels of the interfering cell, except for a single channel of the interfering cell into white noise. Each whitening filter may be dependent on the transmission mode combination.

For transmission mode combinations TM2/TM4 (RI=1), TM2/TM2 or TM4/TM2 the updated noise correlation matrix, $R_n$, may be given by:

$$R_n = h_{int} h_{int}^H + S \quad \text{(Equation 13)}$$

Where S is the noise correlation matrix that represents the contribution of noise and other cells, except for the interfering cell we wish to cancel, and where $h_{int}$ in equation 13 represents any column of the interfering cell in the signal model, e.g., $h_2$ or $h_3$. The operand $A^H$ represents the conjugate transpose of a matrix (or vector) A. It is noted that any column of the interfering cell may be whitened.

For transmission mode combination TM4/TM4; RI=1 there are no additional layers to cancel and the updated noise correlation matrix, $R_n$, may equal the noise correlation matrix, S:

$$R_n = S \quad \text{(Equation 14)}$$

For transmission mode combination TM4/TM4; RI=2 there are three columns in the channel estimation matrix, the first for the serving cell and the other two for the interfering cell. The third column may be whitened. The noise correlation matrix may therefore be calculated using for example:

$$R_n = h_{int} h_{int}^H + S \quad \text{(Equation 15)}$$

Where $h_{int}$ in equation 15 represents any one column of the interfering cell in the signal model, e.g., $h_1$ or $h_2$. Thus, any column of the interfering cell may be whitened.

For TM2/TM4 (RI=2) there may be six columns in the channel estimation matrix, H, two from the serving cell (e.g., serving cell 110) and four from the interfering cell. Therefore, there is a need to whiten three layers. The noise correlation matrix may therefore be calculated using for example:

$$R_n = h_3 h_3^H + h_4 h_4^H + h_5 h_5^H + S \quad \text{(Equation 16)}$$

Where h3, h4 and h5 may include any combination of three interferer columns, out of the four interferer columns.

The whitening filter may be calculated using any whitening transform, for example, by Cholesky decomposition, such that for example:

$$LL^H = R_n \quad \text{(Equation 17)}$$

Thus, in operation 220 whitening filters may be calculated to cover all relevant transmission mode combinations. For example, six whitening filters may be calculated, one for each transmission mode combination TM4/TM4 (RI=2), TM4/TM2, TM4/TM3, TM2/TM2, TM2/TM4 (RI=1) and TM2/TM4 (RI=2). For example, whitening filters may be calculated by applying the Cholesky decomposition given in equation 17 on the relevant noise correlation matrix, the noise correlation matrices given in equations 13, 14, 15 and 16. It should be noted that other number or types of whitening filters may be calculated.

In operation 230 the whitening filters may be applied on the signal models of the tested hypotheses, where the appropriate whitening filter is applied to each signal model. For example, the whitening filter that is calculated for the updated noise correlation matrix given by equation 13 may be applied to the signal model of TM2/TM4 (RI=1) given by equation 6, to the signal model of TM2/TM2 given by equation 5 and to the signal model of TM4/TM2 given by equation 8. The whitening filter that is calculated for the updated noise correlation matrix given by equation 14 may be applied to the signal model of TM4/TM4 (RI=1) given by equation 9, and the whitening filter that is calculated for the updated noise correlation matrix given by equation 15 may be applied to the signal model of TM4/TM4 (RI=2) given by equation 11.

After applying a whitening filter, a new signal model is:

$$y_w = H_w x + w \quad \text{(Equation 18)}$$

Where $y_w$ is the whitened received sample:

$$y_w = L^{-1} y \quad \text{(Equation 19)}$$

$H_w$ is the whitened channel estimation matrix:

$$H_w = L^{-1}[h_0 \ h_1 \ h_2] \text{ or } H_w = L^{-1}[h_0 \ h_1] \quad \text{(Equation 20)}$$

Depending on the number of columns (layers) post whitening, as described above. w is the whitened noise:

$$w = L^{-1} n \quad \text{(Equation 21)}$$

In operation 240 a measure of likelihood that a hypothesis is correct, per hypothesis and per subcarrier may be calculated. The measure of likelihood may be or may include a probability metric, which is a measure or estimation of the probability that a certain hypothesis is the correct hypothesis. In some embodiments the measure of likelihood includes a logarithm of the probability metric, also referred to herein as log-probability. According to some embodiments, the log-probabilities may be calculated for each hypothesis. The log-probability for the n-th hypothesis and the l-th serving cell subcarrier may be calculated by for example:

$$Q(n, l) = \max_{x_0, x_1 \in \{M_0\}, x_2 \in \{M_k\}} -\|y_w - H_w x\|^2 - \log(16|M_k|) - \frac{1}{2} \log(\det(R_n)) - C_k \quad \text{(Equation 22)}$$

Where:
n is the hypothesis number.
l is the serving cell subcarrier number.
$Q(n, l)$ is the log-probability for the n-th hypothesis and l-th subcarrier.
k is the modulation type of the interfering cell, where k=0 represents QPSK, k=1 represents 16 QAM, k=2 represents 64 QAM, k=3 represents 256 QAM. Since each hypothesis includes, inter alia, an assumption of the modulation type of the interfering cell, the value of k is determined by the hypothesis, n.
$x = [x_0, x_1, x_2]^T$ is the symbols vector. The first two elements, $x_0, x_1$, are from the QPSK modulation (k=0) of the serving cell ($x_0$ and $x_1$ represent the hyper-constellation point of the serving cell), and the $3^{rd}$ element, $x_2$, belongs to the interference and may have any modulation (k=0-3).
$M_0$ is the group of all symbols in a hyper constellation of the transmitting cell, which as noted before uses QPSK modulation.
$M_k$ is the group of all symbols in a constellation of the interference for a given modulation k.
$|M_k|$ is the cardinality of $M_k$ (which is the number of symbols in constellation $M_k$). $|M_k|$ is a constant per modulation that is used to normalize the probability of the different modulations.
$\det(R_n)$ is the determinant of the pre-whitened noise correlation matrix $R_n$.
$C_k$ is a correction factor per constellation that compensates for using the suboptimal maximum operation (max) in equation 22.

Thus, in operation 240 a measure of likelihood that a hypothesis is correct, per hypothesis and per subcarrier may be calculated using equation 22. For example, for each tested sub-carrier under each testes hypothesis, the value of $-\|y_w - H_w x\|^2 - \log(16|M_k|) - \frac{1}{2} \log(\det(R_n)) - C_k$, may be calculated for each combination of $x_0, x_1$ and $x_2$, and a maximum value of $-\|y_w - H_w x\|^2 - \log(16|M_k|) - \frac{1}{2} \log(\det(R_n)) - C_k$ may be selected as an estimation of the measure of likelihood, in this case, a log-probability $Q(n, l)$, for a hypothesis and a subcarrier. The range of the log-probabilities depends on the range of the received signal.

In operation 250 cumulative hypothesis metrics may be calculated, e.g., a single cumulative hypothesis metric may be calculated for each tested hypothesis. A cumulative hypothesis metric of a single tested hypothesis may be calculated, for example, based on the measures of likelihood, e.g., the probability metrics or the log-probabilities, of a plurality of subcarriers of the tested hypothesis. For example, the measures of likelihood of the plurality of subcarriers of the tested hypothesis may be aggregated, e.g., if log-probabilities are used, the log-probabilities the plurality of subcarriers of the tested hypothesis may be accumulated. It should be readily understood that adding log-probabilities is equivalent to multiplying probabilities. However, according to some embodiments, using log-probabilities may be more efficient, or less computationally intensive, since some processors may perform additions more efficiently than multiplications. Thus, according to some embodiments, log-probabilities of a tested hypothesis may be accumulated across subcarriers according to for example:

$$Q(n) = \Sigma_l Q(n, l) \quad \text{(Equation 23)}$$

Where $Q(n)$ is the cumulative log-probability for hypothesis n. For example, a cumulative hypothesis metric of a single tested hypothesis may be calculated based on the measures of likelihood of all the subcarriers that are transmitted in parallel during a time slot of a single symbol, or over a time slot of a single slot, or over any other selected time slot. In some embodiments a cumulative hypothesis metric of a single tested hypothesis may be calculated based on the measures of likelihood of only a sub-group of subcarriers, for example, for every second subcarrier (or two out of every four in case of SFBC) that are transmitted in parallel during a time slot of a single symbol.

In operation 260, the most likely hypothesis, e.g., the hypothesis with the highest chances (e.g., compared to other hypotheses) of including the transmission parameters that are actually being used by interfering cell 112, may be selected. For example, the hypothesis having the maximal cumulative hypothesis metric may be selected. According to some embodiments, the most likely hypothesis may be selected according to or using for example:

$$n = \underset{n}{\arg\max}\, Q(n) \quad \text{(Equation 24)}$$

According to some embodiments, blind detection of transmission parameters of an interfering cell may be performed for each received symbol. According to some embodiments, blind detection of transmission parameters of an interfering cell may be performed for only a sub-set of the received symbols. For example, embodiments of the method may be performed periodically, according to any selected schedule, e.g., for every second symbol, for every third symbol, etc. According to some embodiments, blind detection of transmission parameters of an interfering cell may be performed for only a sub-group of subcarriers, for example, for every second subcarrier (or two out of every four in case of SFBC).

In operation 270 joint demodulation of the desired transmission 130 and the interfering transmission 132 may be performed. The joint demodulation may be performed based on or using the most likely hypothesis. According to some embodiments, joint demodulation may include ML detection by combination of an exhaustive search for the serving cell symbols and projection for the interfering cell symbols. At this stage, however, a hypothesis of the transmission parameters of the interfering cell has been selected, and these transmission parameters may be used for the process of joint demodulation. For example, a whitened channel matrix may be known. The straight forward implementation of ML detection may include calculating a measure of likelihood for each possible transmitted value and selecting the transmitted value having the best measure of likelihood. For every hyper constellation point of the serving cell, x0 and x1 a value of x2 may be found using projection as disclosed herein. Equation 22 may be used to find the serving cell symbols, x0 and x1 that provide the best metric (e.g., the maximal log-probability metric). Another option for detecting, x0 and x1 would be using a tree search. The tree search is often more efficient (e.g., uses fewer calculations) than exhaustive search. When NAICS is in use the serving cell is transmitting QPSK only. Thus, for each layer there are four possible transmitted values and a total of 16 options for the combination of the two layers. Thus, for QPSK the complexity of detecting x0 and x1 using exhaustive search is not larger than a tree search, especially since a tree search requires some pre calculations. However, embodiments of the invention are not limited in this regard, and any method, including exhaustive search and tree-search may be used for detecting the transmitted MIMO signal in combination with embodiments of the present invention. According to some embodiments, the hyper constellation point of the serving cell, x0 and x1, which was found while calculating measure of likelihood that a hypothesis is correct, per hypothesis and per subcarrier (e.g., in operation 240), may be used. For example, for a given sub-carrier, x0 and x1 may be selected to equal the values of x0 and x1 that gave the maximal or best probability metric for the hypothesis that was eventually selected.

According to some embodiments a measure of confidence, e.g., a confidence value, may be calculated for the selected hypothesis. The measure of confidence may be indicative of the correctness of the selected hypothesis. A confidence value, conf, may be calculated based the cumulative measure of likelihood for hypothesis n, the selected hypothesis, and the measures of likelihood of other hypotheses. For example, a confidence value, conf, may be calculated by the relation of the cumulative log-probability for hypothesis n to the sum of the cumulative log-probabilities for the entire set of possible hypotheses:

$$conf = \frac{Q(n)}{\sum_m Q(m)} \qquad \text{(Equation 25)}$$

Equation 25 is non-limiting and the confidence value may be calculated according to any applicable method. The confidence value may be compared to a threshold. The UE may determine whether to perform joint demodulation based on the selected hypothesis or whether to perform default demodulation based on the comparison. For example, if the confidence value is below the threshold, it may be concluded that the most likely hypothesis was selected with low confidence. In this case the joint demodulation based on the selected hypothesis may not be performed and instead default demodulation of the received signals from the serving cell may be carried out, e.g., the receiver of the UE may function as a base line receiver and may perform demodulation of signals received from the serving cell without joint demodulation of the signals received from the interfering cell. If, however, the confidence value is equal to or larger than the threshold, this may indicate that the most likely hypothesis was selected with high confidence and that chances are high that the interfering cell indeed uses this hypothesis. In this case the joint demodulation may be performed based on the selected hypothesis.

Figure 3:
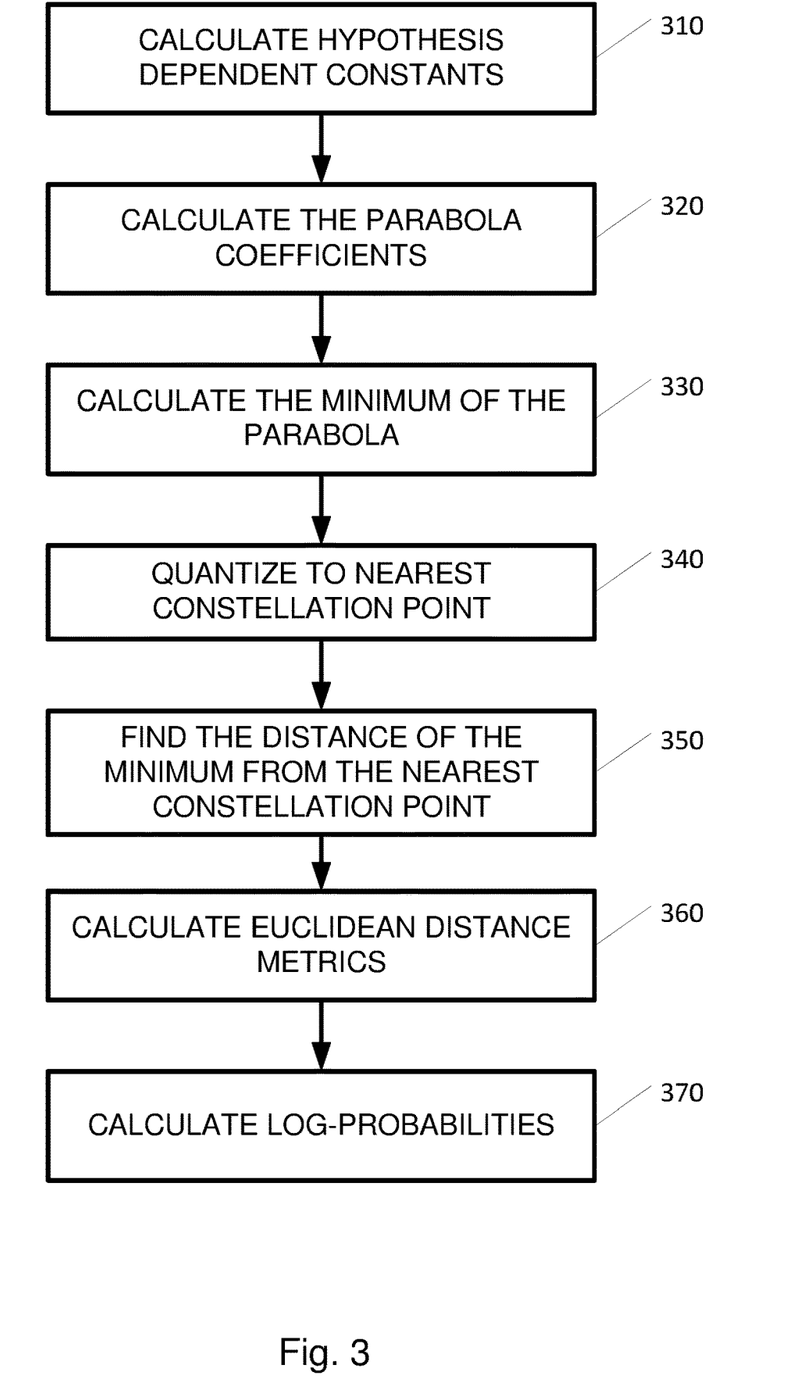
FIG. 3 is a flowchart diagram illustrating a method for calculating a log probability value, according to embodiments of the present invention.

Reference is now made to FIG. 3, which is a flowchart diagram illustrating a method for calculating the log-probabilities, according to embodiments of the present invention. The method for calculating log-probabilities may be an elaboration of operation 240 presented in FIG. 2. According to some embodiments, a method for calculating log-probabilities may be performed by any suitable processor, for example, processor 410 depicted in FIG. 4. According to some embodiments, a method for blind detection of transmission parameters of an interfering cell, e.g., interfering cell 112, may be performed by UE, for example, UE 120. In some embodiments a method for calculating log-probabilities may be performed by a processor (e.g., processor 410) and initiated by a set of commands or instructions.

In operation 310 hypothesis dependent parameters required for the calculation of the log-probabilities may be calculated. The hypothesis dependent parameters may include for example $\log(16|M_k|)$, $\frac{1}{2}\log(\det(R_n))$ and $C_k$. The terms $\log(16|M_k|)$ and $C_k$ may depend on the transmission mode of the interfering cell only, and therefore four values of $\log(16|M_k|)$ and four values of $C_k$ may be calculated, each for a respective transmission mode. The term $\frac{1}{2}\log(\det(R_n))$ may depend on the transmission mode and RI of the interfering cell as well as on the transmission mode of the interfering cell according to equations 13-16. Thus, four values of $\log(\det(R_n))$ may be calculated, a first value for TM2/TM4 (RI=1), TM2/TM2 or TM4/TM2 based on equation 13, a second value for TM4/TM4; RI=1 based on equation 14, a third value for TM4/TM4; RI=2 based on equation 15, and a fourth value for TM2/TM4 (RI=2) based on equation 16.

A square root of the term $-\|y_w-H_w x\|^2$ (from Equation 22), may represent a distance, e.g., in Volts (or a linear scale of Volts) of the whitened received sample or signal $y_w$ from a hypothetical expected signal $H_w x$. The term $-\|y_w-H_w x\|^2$, also referred to herein as the whitened noise metric, may relate to a squared Euclidian norm of a measure or an approximation of the whitened noise w (see equation 18). $-\|y_w-H_w x\|^2$ may be calculated per subcarrier, per hyper constellation point and per hypothesis. Therefore, this calculation may be extremely computationally complex. As used herein, a hyper constellation point may refer to a joint constellation point of all the transmitted symbol, for example, of the serving cell. For example, in some embodiments the serving cell may only transmit two symbols concurrently, each using QPSK. In this scenario, each transmitted symbol may have 4 possible constellation points, and the hyper constellation, which includes both transmitted symbols may include 16 constellation points. For example, according to prior art, the calculation involves iterating over every possible value of the vector of the transmitted symbols from the serving cell and the interfering cell, x. Without using projection this includes four options for each layer of the serving cell (which is 4*4=16) and over all possible values of the interfering layer, which is up to 256 options. Thus, iterations over 4*4*256=4K options may be required. With projection this would involve iterating over all possible values of the transmitted symbols, which is 16 values in case of QPSK (four for x0 and four for x1), for every hypothesis (up to 108) resulting with a search over up to 1728 options.

Embodiments of the present invention provide a method for performing at least a portion of the calculation of the whitened noise metric jointly on a plurality of hypotheses. The joint calculation may be performed by reusing a portion of the calculations and doing only minor calculations per hypothesis. Thus, according to embodiments of the present invention, the complexity of the calculation of the whitened noise metric may be dramatically reduced. For example, the calculation of the whitened noise metric may be performed jointly on 4, and sometimes 12, hypotheses, reusing most of the calculations and performing only minor calculations per single hypothesis.

According to embodiments of the present invention, search may be done over 3 layers, where the first two pertain to serving cell 110 and the last one pertain to the interfering cell. The complexity may be reduced significantly by searching only the first two layers, which are known to be modulated according to QPSK, and projecting over the last layer, which can be modulated using any modulation type out of the four modulation types possible.

According to some embodiments, the process may include setting values for the part of the vector of the transmitted symbols that is attributed to the serving cell (e.g., x0 and x1), and projecting over the last layer, e.g., finding the part of the vector of the transmitted symbols that is attributed to the interfering cell (e.g., x2 in case of three layers post whitening), by minimizing for example the following whitened noise parabola:

$$\|y_w - H_{w,R*T}x\|^2 = \left\|\underbrace{y_w - \tilde{H}_{w,R*(T-1)}\tilde{x}_{T-1}}_{\tilde{y}} - h_{w,int}x_{int}\right\|^2 = \quad \text{(Equation 26)}$$
$$\|\tilde{y}\|^2 - x_{int}(\tilde{y}^H\tilde{h}) - x^*_{int}(\tilde{h}^H\tilde{y}) + |x_{int}|^2(\tilde{h}^H\tilde{h}) =$$
$$A + x_{int}B^* + x^*_{int}B + |x_{int}|^2 C$$

Where R indicates the number of virtual antennae of the receiver, e.g., UE 120, and equals the number of rows in the equivalent channel matrix post whitening, $H_w$. Typically, two physical antennae, e.g., antennae 125, exist at the receiver. T indicates the number of layers post whitening, and equals the number of columns in the equivalent channel matrix post whitening, $H_w$. $H_{w,R,T}$ is the equivalent channel matrix post whitening, $H_w$, only with different notations, and $\|y_w - H_{w,R*T}x_T\|^2$ is the same as $-\|y_w - H_w x\|^2$ (from Equation 22), only with different notations. $H_{w,R*T}x_{(T-1)}\tilde{x}_{T-1}$ represents the part of the equivalent channel matrix post whitening and the transmitted symbol that is attributed to the serving cell. $\tilde{y}$ is the part of the received sample that is attributed to the interfering cell after whitening, $\tilde{y}=y_w-\hat{H}_{w,R*(T-1)}\tilde{x}_{T-1}$, where, $\hat{H}_{w,R*(T-1)}$ is the channel estimation matrix post whitening representing the serving cell contribution, and $\tilde{x}_{T-1}$ is the part of the vector of the transmitted symbols that is attributed to the serving cell (e.g., the hyper constellation point of the transmitted symbols from the serving cell). $\tilde{h}$ is the same as $h_{w,int}$. $h_{w,int}$ represents the column of the equivalent channel matrix after whitening, $H_w$ that is attributed to the interfering cell, and $x_{int}$ is the part of the vector of the transmitted symbols that is attributed to the interfering cell. $A=\|\tilde{y}\|^2$; $B^*=(\tilde{y}^H\tilde{h})$; $B=(\tilde{h}^H\tilde{y})$; and $C=(\tilde{h}^H\tilde{h})$; since $\tilde{y}$ and $\tilde{h}$ are known for each combination of x0 and x1, A, B, C may be seen as scalars (when deriving over $x_{int}$), where B is complex (B* is the complex conjugated value of B), and C is real. A value of $\tilde{y}$ may be calculated for each of the hyper constellation points of the serving cell.

Equation 26 is a quadratic function which defines a parabola, referred to herein as the whitened noise parabola, with the coefficients A, B and C. The minimum point of the whitened noise parabola may be at $x_{min}=-B/C$. $x_{int}$ may be estimated for example by finding a value that will minimise the whitened noise parabola, $\|y_w - H_{w,R*T}x\|^2$. Therefore, the best constellation point for the 3$^{rd}$ layer may be found by searching around the minimum point of the whitened noise parabola presented in equation 26 based on allowed constellation points, and selecting the constellation point of interfering cell 112 that is closest to the minimum point of the whitened noise parabola. Because of the convex shape of the parabola, results obtained by searching around the minimum point of the parabola are in some embodiments guaranteed to be identical to exhaustive search. In operation 320, the parabola coefficients A, B and C may be calculated. A, B and C depend on both the transmission parameters of the interfering cell, as well as on the hyper constellation point of the serving cell. Thus, if the serving cell uses TM4 or TM9, and transmits two subcarriers using QPSK modulation, the calculation of the parabola coefficients A, B and C may have to be performed 108*16=1728 times for each received symbol, once for each combination of hypothesis and hyper constellation point. According to embodiments of the present invention, the number of calculations may be reduced by a factor of nearly four, by reusing some of the calculations of the parabola coefficients A, B and C. According to some embodiments calculation of the parabola coefficients A, B and C may be common for all four modulation types of the interfering cell. Thus, the parabola coefficients A, B and C may be calculated once for each subgroup of four modulation types. For example, if the serving cell uses TM4 or TM9, instead of repeating the calculation of A, B and C for 1728 times as in:

$$16*[3(Pa)*(7(PMI/RI)_{(TM4/TM9)}+1(TM2)+1(TM3))*4 \text{ (modulation type)})]==16*108=1728$$

The calculation may be repeated 432 times:

$$16*[3(Pa)*(7(PMI/RI)_{(TM4/TM9)}+1(TM2)+1(TM3))]= 16*108/4=432$$

Which is a reduction to nearly a fourth of the theoretical required calculations.

Furthermore, the number of calculations may be further reduced based on QPSK characteristics. As noted before, NAICS is utilized when the receiver UE is located far from the serving cell. Thus, the serving cell typically uses QPSK. According to embodiments of the present invention, when the serving cell uses QPSK the following holds true:

I. C may have the same value for all 16 hyper constellation points of the serving cell and therefore may be calculated jointly for all 16 hyper constellation points. Thus, the calculation of C may be repeated for 28 times:

$$1*[3(Pa)*(7(PMI/RI)_{(TM4/TM9)}+1(TM2)+1(TM3))+1 \text{ (no\_PDSCH)}]=28$$

II. A may be calculated based on linear combinations of the terms $y_w^H y_w$, $y_w^H h_{w,1}$, $y_w^H h_{w,2}$, $h_{w,1}^H h_{w,2}$, $h_{w,1}^H h_{w,1}$, $h_{w,2}^H h_{w,2}$. Each one of these terms may be calculated jointly (possibly in advance) for each hyper constellation point of the serving cell. These terms may be multiplied by either +1 or −1 according to the value of x0 and x1, and the results of the multiplications may be accumulated.

III. B may be calculated based on linear combination of the terms $y_w^H h_w$, $h_{w,1}^H h_w$, $h_{w,1}^H h_w$. Each one of these terms may be calculated jointly (possibly in advance) for each hyper constellation point of the serving cell. These terms may be multiplied by either +1 or −1 according to the value of x0 and x1, and the results of the multiplications may be accumulated.

Furthermore, it may be shown that:

$$A + xB^* + x^*B + |x|^2 C = A - \frac{|B|^2}{C} + C|\Delta x|^2,$$ (Equation 27)

where $\Delta x = X - (-B/C)$

In operation 330, the minimum point of the search parabola may be found for example by calculating $x_{min}=-B/C$. In operation 340, quantization to the nearest constellation point, X, may be performed. The constellation points depend on the modulation type of the interfering cell. Thus, this step may be repeated for each possible modulation type of the interfering cell, for example, quantization may be repeated for QPSK, 16 QAM, 64 QAM and 256 QAM. By quantizing to the nearest constellation point, a vector of the transmitted symbols from the interfering cell may be estimated, for substantially each possible modulation type of the interfering cell. As explained above, this step may replace extensive search. In operation 350 $\Delta x$, which is the distance of the minimum from the nearest constellation point, may be calculated, for example, according to $\Delta x=X-(-B/C)$. In operation 360, the whitened noise metric may be calculated. The whitened noise metric may be calculated by calculating the term $$A - \frac{|B|^2}{C} + C|\Delta x|^2$$

for each hypothesis and each subcarrier. According to embodiments of the present invention, the terms $-B/C$ and $$A - \frac{|B|^2}{C}$$

may be common for all four modulation types of the interfering cell and thus may be calculated once for each subgroup of four modulation types. Thus, if the serving cell uses TM4 or TM9, and transmits two subcarriers using QPSK modulation, the calculation of the terms $-B/C$ and $$A - \frac{|B|^2}{C}$$

may be repeated 432 times instead of 1728 times. However, since $\Delta x$ may be different for each hypothesis, the calculation of $C|\Delta x|^2$ and the addition of $$A - \frac{|B|^2}{C}$$

with $C|\Delta x|^2$ may need to be repeated for each hypothesis of the interfering cell and each hyper constellation point of the serving cell. Thus, if the serving cell uses TM4 or TM9, and transmits two subcarriers using QPSK modulation, the calculation of $C|\Delta x|^2$ and the addition of $$A - \frac{|B|^2}{C}$$

with $C|\Delta x|^2$ may be repeated 1728 times.

In operation 370, the log-probabilities per subcarrier and per hypothesis may be calculated. For example, the log-probabilities may be calculated according to equation 22, using the terms calculated at operation 360 for the whitened noise metric and the hypothesis dependent parameters calculated in operation 310.

According to some embodiments of the present invention, For TM4/TM4 mode additional saving in complexity may be possible. The power to data ratio (Pa) may be searched by embedding the power factor not in the channel but instead in the constellation point. Thus, there may be more constellation points to search for, e.g., 12 points (4 constellations*3 power offsets). When the nearest constellation point is found, values for $\Delta x$ and $C|\Delta x|^2$ may be calculated. This saves calculations since when the Pa is embedded in the constellation point instead of in the channel, the number of channel matrices, is reduced by a factor of nearly three to 108/3=36. This reduction in the required calculations may be achieved in addition to other methods for reducing the number of required calculations described herein. It is noted, however, that embedding Pa in other TM combinations is not possible because a different whitening filter may be needed in these cases resulting in different A, B, C per Pa value.

Figure 4:
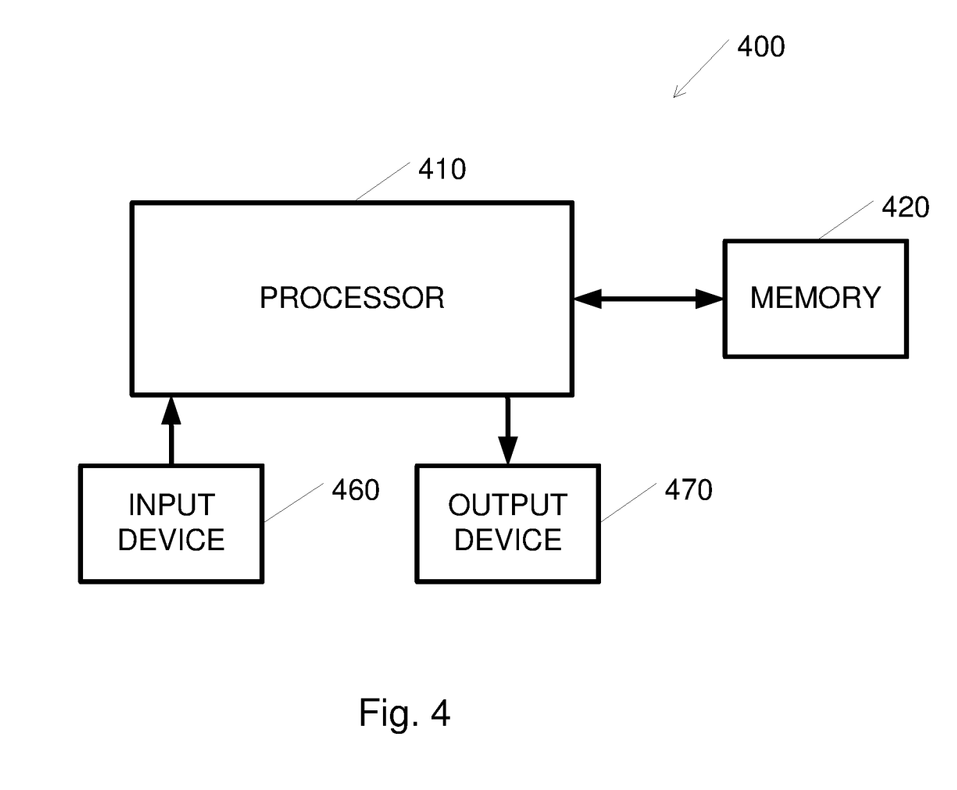
FIG. 4 is schematic illustration of an exemplary device according to embodiments of the invention.

Reference is made to FIG. 4, which is a schematic illustration of an exemplary device according to embodiments of the invention. A device 400 may include a computer device having a wireless communication capabilities, including for example, a UE, e.g., UE 120, a smartphone, a cellular telephone or communications device, a cellular telephone, etc. Device 400 may include any device capable of executing a series of instructions, for example for performing the methods disclosed herein. Device 400 may include an input device 460 such as a mouse, a receiver, a keyboard, a microphone, a camera, a Universal Serial Bus (USB) port, a compact-disk (CD) reader, any type of Bluetooth input device, etc., and an output device 470, for example, a transmitter or a monitor, projector, screen, printer, speakers, or display.

Device 400 may include a processor 410. Processor 410 may include or may be a vector processor, a central processing unit (CPU), a digital signal processor (DSP), a microprocessor, a controller, a chip, a microchip, a field-programmable gate array (FPGA), an application-specific integrated circuit (ASIC) or any other integrated circuit (IC), or any other suitable multi-purpose or specific processor or controller.

Device 400 may include a memory unit 420. Memory unit 420 may be or may include any of a short-term memory unit and/or a long-term memory unit. Memory unit 420 may include, for example, random access memory (RAM), dynamic RAM (DRAM), flash memory, volatile memory, non-volatile memory, a tightly-coupled memory (TCM), a buffer, a cache, such as an L-1 cache and/or an L-2 cache, or other suitable memory units or storage units. Memory unit 420 may be implemented as separate (for example, "off-chip") or integrated (for example, "on-chip") memory unit, or as both.

Processor 410 may request, retrieve, and process data from memory unit 420 and may control, in general, the pipeline flow of operations or instructions executed on the data. Processor 410 may receive instructions, for example, from a program memory (for example, in memory unit 420 to perform methods disclosed herein. According to embodiments of the present invention, processor 410 may receive instructions to perform blind detection of transmission parameters of an interfering cell and joint demodulation as described herein.

Embodiments of the invention may be implemented for example on an integrated circuit (IC), for example, by constructing processor 410, as well as other components of FIG. 4 in an integrated chip or as a part of an chip, such as an ASIC, an FPGA, a CPU, a DSP, a microprocessor, a controller, a chip, a microchip, etc.

According to embodiments of the present invention, some units e.g., processor 410, as well as the other components of FIG. 4, may be implemented in a hardware description language (HDL) design, written in Very High Speed Integrated Circuit (VHSIC) hardware description language (VHDL), Verilog HDL, or any other hardware description language. The HDL design may be synthesized using any synthesis engine such as SYNOPSYS® Design Compiler 2000.05 (DC00), BUILDGATES® synthesis tool available from, inter alia, Cadence Design Systems, Inc. An ASIC or other integrated circuit may be fabricated using the HDL design. The HDL design may be synthesized into a logic level representation, and then reduced to a physical device using compilation, layout and fabrication techniques, as known in the art.

Embodiments of the present invention may include a computer program application stored in non-volatile memory, non-transitory storage medium, or computer-readable storage medium (e.g., hard drive, flash memory, CD ROM, magnetic media, etc.), storing instructions that when executed by a processor (e.g., processor 410) carry out embodiments of the invention. Processor 410 may be configured to carry out embodiments described herein by for example executing software or instructions.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for selecting a most likely hypothesis for performing joint demodulation of a desired transmission received from a serving cell and an interfering transmission received from an interfering cell transmitting in an unknown combination of transmission parameters the method comprising:

for each one of a plurality of subcarriers:
performing, for a plurality of tested hypotheses of the interfering cell transmission parameters, a search over serving cell symbols and projection for interfering cell symbols by minimizing a whitened noise parabola for each combination of a tested hypothesis and hyper constellation point of the serving cell symbols, and selecting a constellation point for the interfering cell that is closest to the minimum point of the whitened noise parabola, wherein the whitened noise parabola represents a distance of a whitened received signal from a hypothetical expected signal, wherein a tested hypothesis comprises a single combination of the transmission parameters of the interfering cell, wherein coefficients of the whitened noise parabola are calculated once for each subgroup of four hypotheses which differ only by modulation types of the interfering cell;
calculating a whitened noise metric for each combination of a tested hypothesis and hyper constellation point of the serving cell, wherein coefficients of the whitened noise metric are calculated once for each subgroup of four modulation types of the interfering cell; and
calculating a measure of likelihood for each of the tested hypotheses based on the whitened noise matrices;
calculating a cumulative measure of likelihood for each of the tested hypotheses, based on the measures of likelihood of the plurality of subcarriers for the respective tested hypothesis; and
selecting the most likely hypothesis based on the cumulative measure of likelihood.

2. The method of claim 1, wherein performing the search comprises:
estimating an equivalent channel matrix to generate a signal model for each of the tested hypotheses; and
calculating a whitening filter for each of the tested hypotheses, based on a noise correlation matrix and on a channel estimation for the interfering cell from the equivalent channel matrix,
wherein the whitened noise parabola is based on a respective whitened channel estimation matrix.

3. The method of claim 1, wherein the serving cell transmits in quadrature phase-shift keying (QPSK), and wherein coefficients of the whitened noise parabola depend on the transmission parameters of the interfering cell, as well as on the hyper constellation point of the serving cell.

4. The method of claim 1, wherein coefficients of the whitened noise parabola are:

$$A=\|\tilde{y}\|^2;\ B^*=(\tilde{y}^H\tilde{h});\ B=(\tilde{h}^H\tilde{y});\ \text{and}\ C=(\tilde{h}^H\tilde{h}),$$

where $\tilde{y}^H$ is a conjugate transpose of $\tilde{y}$ which is a part of a received sample that is attributed to the interfering cell after whitening, $B^*$ is a complex conjugated value of $B$, and $\tilde{h}^H$ is a conjugate transpose of $\tilde{h}$ which is one column of the interfering cell in the signal model.

5. The method of claim 4, wherein the minimum point of the whitened noise parabola is at $x_{min}=-B/C$.

6. The method of claim 4, wherein C is calculated jointly for all 16 hyper constellation points of the serving cell.

7. The method of claim 4, wherein A and B are calculated as a linear combination of terms that are calculated jointly for each hyper constellation point of the serving cell.

8. The method of claim 1, wherein calculating a measure of likelihood for a subcarrier and hypothesis comprises selecting a maximum value of a term that is a combination of the whitened noise metric of each constellation point of the serving cell and each hypothesis, and hypothesis dependent parameters.

9. The method of claim 1, comprising for a subgroup of hypotheses in which transmission mode of the serving cell is TM4 and transmission mode of the interfering cell is TM4, embedding the power factor in the constellation point.

10. The method of claim 1, comprising performing the joint demodulation based on the most likely hypothesis.

11. The method of claim 1, wherein the interfering cell transmission parameters comprise: modulation type, power ratio (Pa), precoding schemes and layers (PMI/RI), and transmission mode (TM).

12. The method of claim 1, comprising:
calculating a confidence value for the most likely hypothesis based the cumulative measures of likelihood;

comparing the confidence value to a threshold; and
determining whether to perform demodulation or joint demodulation based on the comparison.

13. A device for selecting a most likely hypothesis performing joint demodulation of a desired transmission received from a serving cell transmitting in quadrature phase-shift keying (QPSK), and an interfering transmission received from an interfering cell transmitting in an unknown combination of the following transmission parameters: modulation type, power ratio (Pa), precoding schemes and layers (PMI/RI), and transmission mode (TM), the device comprising:
a processor configured to:
for each one of a plurality of subcarriers:
perform, for a plurality of tested hypotheses of the interfering cell transmission parameters, a search over serving cell symbols and projection for interfering cell symbols by minimizing a whitened noise parabola for each combination of a tested hypothesis and hyper constellation point of the serving cell symbols, and selecting a constellation point for the interfering cell that is closest to the minimum point of the whitened noise parabola, wherein the whitened noise parabola represents a distance of a whitened received signal from a hypothetical expected signal, wherein coefficients of the whitened noise parabola are calculated once for each subgroup of four modulation types of the interfering cell, wherein a tested hypothesis comprises a single combination of the transmission parameters of the interfering cell;
calculate a whitened noise metric for each combination of a tested hypothesis and hyper constellation point of the serving cell, wherein coefficients of the whitened noise metric are calculated once for each subgroup of four hypotheses which differ only by modulation types of the interfering cell; and
calculate a measure of likelihood for each of the tested hypotheses based on the whitened noise matrices;
calculate a cumulative measure of likelihood for each of the tested hypotheses, based on the measures of likelihood of the plurality of subcarriers for the respective tested hypothesis; and
select the most likely hypothesis based on the cumulative measure of likelihood.

14. The device of claim 13, wherein the processor is configured to perform the search by:
estimating an equivalent channel matrix to generate a signal model for each of the tested hypotheses; and
calculating a whitening filter for each of the tested hypotheses, based on a noise correlation matrix and on a channel estimation for the interfering cell from the equivalent channel matrix,
wherein the whitened noise parabola is based on a respective whitened channel estimation matrix.

15. The device of claim 13, wherein coefficients of the whitened noise parabola depend on the transmission parameters of the interfering cell, as well as on the hyper constellation point of the serving cell.

16. The device of claim 13, wherein coefficients of the whitened noise parabola are:

$$A = \|\tilde{y}\|^2;\ B^* = (\tilde{y}^H \tilde{h});\ B = (\tilde{h}^H \tilde{y});\ \text{and}\ C = (\tilde{h}^H \tilde{h}),$$

Where, $\tilde{y}^H$ is a conjugate transpose of $\tilde{y}$ which is a part of a received sample that is attributed to the interfering cell after whitening, $B^*$ is a complex conjugated value of B, and $\tilde{h}^H$ is a conjugate transpose of $\tilde{h}$ which is one column of the interfering cell in the signal model.

17. The device of claim 16, wherein the minimum point of the whitened noise parabola is at $x_{min} = -B/C$.

18. The device of claim 16, wherein the processor is configured to calculate C jointly for all 16 hyper constellation points of the serving cell and wherein the processor is configured to calculate A and B as a linear combination of terms that are calculated jointly for each hyper constellation point of the serving cell.

19. The device of claim 13, wherein the processor is configured to calculate a measure of likelihood for a subcarrier and hypothesis by selecting a maximum value of a term that is a combination of the whitened noise metric of each constellation point of the serving cell and each hypothesis, and hypothesis dependent parameters.

20. The device of claim 13, wherein for a subgroup of hypotheses in which transmission mode of the serving cell is TM4 and transmission mode of the interfering cell is TM4, the processor is configured to embed the power factor in the constellation point.

21. The device of claim 13, wherein the processor is configured to perform the joint demodulation based on the most likely hypothesis.

22. A method for selecting a most likely hypothesis for performing joint demodulation of a desired transmission received from a serving cell transmitting in quadrature phase-shift keying (QPSK), and an interfering transmission received from an interfering cell transmitting in an unknown combination of transmission parameters, the method comprising:
defining a plurality of tested hypotheses, wherein a tested hypothesis comprises a single combination of the transmission parameters of the interfering cell
for each one of a plurality of subcarriers:
for each combination of a tested hypothesis and hyper constellation point of the serving cell: performing a search for the serving cell symbols and projection for the interfering cell symbols by minimizing a whitened noise parabola, wherein the whitened noise parabola represents a distance of a whitened received signal from a hypothetical expected signal, and selecting a constellation point for the interfering cell that is closest to the minimum point of the whitened noise parabola, wherein coefficients of the whitened noise parabola are calculated once for each subgroup of four modulation types of the interfering cell, and calculating a whitened noise metric, wherein coefficients of the whitened noise metric are calculated once for each subgroup of four hypotheses which differ only by modulation types of the interfering cell; and
calculating a measure of likelihood for each of the tested hypotheses based on the whitened noise matrices;
calculating a cumulative measure of likelihood for each of the tested hypotheses, by combining the measures of likelihood of the plurality of subcarriers for the respective tested hypothesis; and
selecting the most likely hypothesis based on the cumulative measure of likelihood.

* * * * *